Sept. 9, 1924.

R. R. ROOT 1,507,686

METHOD AND APPARATUS FOR VULCANIZING RUBBER ARTICLES

Filed Dec. 29, 1919

Inventor
Ralph R. Root.
By
Thurston, Kwis & Hudson
attys.

UNITED STATES PATENT OFFICE.

RALPH R. ROOT, OF LAKEWOOD, OHIO.

METHOD AND APPARATUS FOR VULCANIZING RUBBER ARTICLES.

Application filed December 29, 1919. Serial No. 347,891.

*To all whom it may concern:*

Be it known that I, RALPH R. ROOT, a citizen of the United States, residing at Lakewood, in the county of Cuyahoga and State of Ohio, have invented a certain new and useful Improvement in Methods and Apparatus for Vulcanizing Rubber Articles, of which the following is a full, clear, and exact description.

This invention relates to a method and apparatus for the heating of molds, more particularly molds containing rubber articles to be vulcanized by heat.

An important object of the invention is to apply heat to the molds by subjecting them to a fluctuating magnetic field whereby electric currents are induced in the body of the mold, which currents are largely eddy currents and calculated to generate considerable heat in the body of the mold.

A further object of the invention is to manipulate the mold during the period of its subjection to the magnetic field to insure equal heating of the mold.

The invention further contemplates the heating of a mold or molds by continuously passing molds through a pulsating magnetic field, thereby making the heating action a continuous process.

Figure 1:
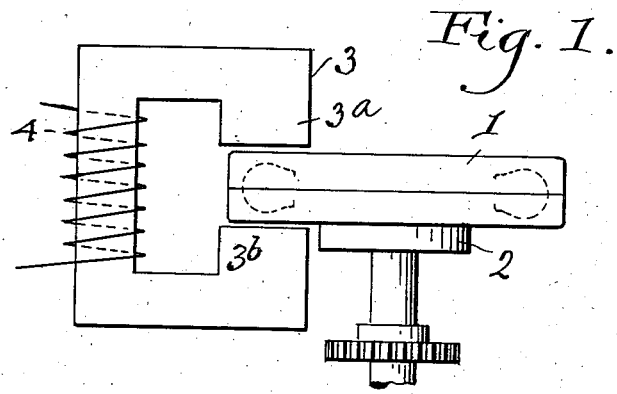
Figure 2:
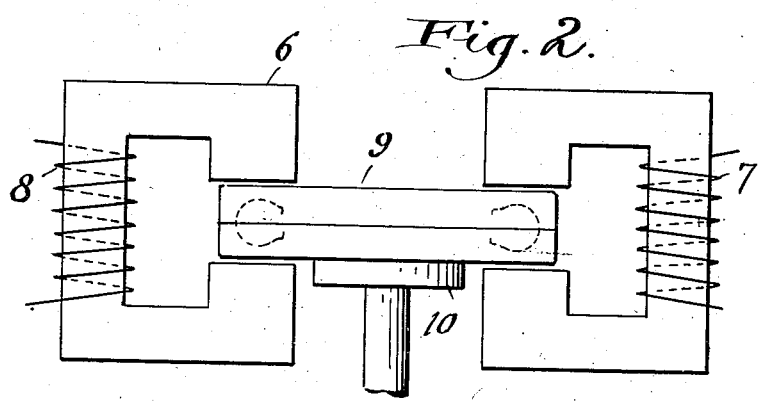
Figure 3:
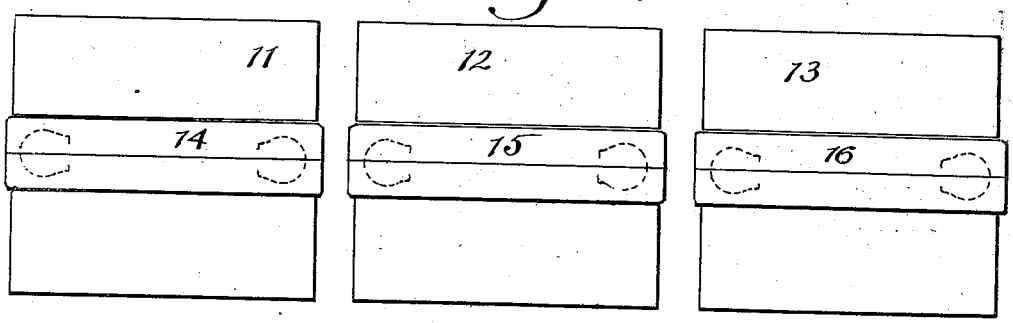

Reference should be had to the accompanying drawings in which Fig. 1 represents an elevation and somewhat diagrammatically an apparatus for carrying out the method of my invention; Fig. 2 is an elevation somewhat diagrammatic of a modified form of apparatus; Fig. 3 is an elevation somewhat diagrammatic of another form of apparatus for carrying out my invention.

The molds for molding rubber articles are usually made of cast iron which as is well known, is magnetically speaking, very permeable. The molds which would be employed in carrying out my invention are precisely of the form and shape as usually employed so that no departure from usual practice in this respect is necessitated.

Such a mold as represented at 1 in Fig. 1 may be placed on a suitable revolving table 2 which table may be revolved in any desired manner. The table is placed adjacent to a core 3 which is approximately wound with a coil 4. To the coil 4 there is supplied a fluctuating or pulsating current, that is to say, the current may be alternating or it may be unidirectional but the circuit may be broken with more or less rapidity so that the current supplied to the coil is pulsating. The current passing through the coil 4 sets up a magnetic field and the magnetic stream in passing through the core 3 passes from the head 3ª to the head 3ᵇ. In other words there is a gap between the head 3ª and 3ᵇ and within this gap extends a portion of the mold 1, and inasmuch as the mold 1 is rotatable with the table 2, different portions of the mold 1 are successively brought into the gap between the heads 3ª and 3ᵇ.

The mold 1 is thus subjected to the magnetic field which is of course constantly changing in its density due to the character of current supplied to the coil 4 and hence a current or currents are induced in the mold 1, which currents are largely eddy currents and have a high heat value. By rotating the mold the various portions of the mold are brought in succession within the magnetic field and hence the body of the mold is heated to a more even and equal degree.

It will of course be understood that where the mold is small the entire mold may be at one time subjected to the action of the magnetic field.

The mold is subjected to the action of the magnetic field through a period of time sufficient to cause the desired rise in temperature in the body of the mold to effect the vulcanizing action, after which the mold is cooled and opened in the usual and well known manner.

If desired a mold of said size as is a tire mold may be simultaneously subjected to the action of two or more magnetic fields. Such an arrangement is shown in Fig. 2 wherein there are two cores 5 and 6 with their cooperating coils 7 and 8 arranged so as to cooperate with different parts of a mold 9 mounted upon a table 10. The table 10 may be rotated the same as suggested with respect to the table 2.

Such an arrangement as suggested of course shortens the time of treatment necessary to bring a mold to the required vulcanizing temperature. While two cores are shown it will be apparent that any desired number may be employed.

In many instances it is desirable to make the treatment of the molds a continuous process and this may be accomplished by providing a series of wound cores such as indicated at 11, 12, and 13. These cores may be so arranged and designed that as the m spective molds such as indicated at 15 and 16 pass through the gap between the poles of the respective cores, they are subject to the action of the magnetic flux and the molds are progressively moved from one core to the next so that they are successively heated by passing through the gap of each of the cores and after having passed through the gap of the last core will be sufficiently heated to have accomplished the vulcanizing action. Under such a system the molds are passed through the magnetic gap of the various cores in succession and continuously.

As is well known at the present time the vulcanizing process is usually carried out in steam chambers. This requires not only an extensive equipment but the time and labor involved is very great. On the other hand by the proposed method the time required to produce the vulcanizing action may be considerably shortened and the process is much simplified, furthermore, by using the present process the vulcanization of rubber articles in molds may be made a continuous process which is not obtainable by methods or apparatus at present employed.

Having described my invention, I claim:

1. The method of vulcanizing rubber articles in metal molds which consists in successively subjecting parts of the mold to the action of a magnetic field of constantly changing density.

2. The method of vulcanizing rubber articles in metal molds which consists in subjecting the mold containing the article successively to magnetic fields which are of constantly changing density.

3. Apparatus for vulcanizing rubber articles, a core member having a gap formed therein and a mold made of magnetically permeable material within the said gap and a conducting coil adapted to receive a pulsating current.

In testimony whereof, I hereunto affix my signature.

RALPH R. ROOT.